(12) United States Patent
Tojo et al.

(10) Patent No.: US 6,503,599 B1
(45) Date of Patent: Jan. 7, 2003

(54) POLYESTER FILM WITH SPECIFIED SURFACE ROUGHNESS, YOUNG'S MODULUS AND HEAT SHRINKAGE FOR USE AS SUBSTRATE FOR MAGNETIC RECORDING MEDIUM

(75) Inventors: Mitsuo Tojo, Sagamihara (JP); Toshifumi Osawa, Sagamihara (JP)

(73) Assignee: Teijin Limited, Osaka (JP)

( * ) Notice: Subject to any disclaimer, the term of this patent is extended or adjusted under 35 U.S.C. 154(b) by 209 days.

(21) Appl. No.: 09/613,732

(22) Filed: Jul. 11, 2000

(30) Foreign Application Priority Data

Jul. 12, 1999 (JP) .............................. 11-197532
Jul. 23, 1999 (JP) .............................. 11-208952

(51) Int. Cl.$^7$ ............................ B32B 27/36; G11B 5/73
(52) U.S. Cl. .................... 428/141; 428/212; 428/409; 428/480; 428/694 SL; 428/694 SG
(58) Field of Search ................. 428/480, 910, 428/212, 141, 614 SG, 694 SL, 409

(56) References Cited

U.S. PATENT DOCUMENTS

| | | | |
|---|---|---|---|
| 4,568,600 A | | 2/1986 | Ono et al. |
| 5,268,135 A | * | 12/1993 | Sasaki et al. ............ 264/210.7 |
| 5,677,033 A | | 10/1997 | Hamano et al. |
| 5,912,063 A | * | 6/1999 | Osawa et al. ............... 428/141 |
| 6,221,461 B1 | * | 4/2001 | Kobayashi et al. ......... 428/143 |

FOREIGN PATENT DOCUMENTS

| | | |
|---|---|---|
| EP | 504 416 | 9/1992 |
| EP | 609 077 | 8/1994 |
| EP | 822 220 | 2/1998 |
| JP | 63-57238 | 1/1988 |
| JP | 11-034262 A * | 2/1999 |
| JP | 11-124449 * | 5/1999 |
| JP | 11-216823 * | 8/1999 |

OTHER PUBLICATIONS

English Translation of JP–11–216823–A.*
English Translation of JP–11–124449–A.*
JPO Abstract Translation of JP 11–034262A (Clipped Image No. JP411034262A) No Date.*
Derwent Abstract Translation of JP 11–12449A (Derwent Acc No. 1999–341677) No Month.*
Derwent Abstract Translation of JP 11–216823A (Derwent Acc No. 1999–502009) No Month.*
Derwent Abstract Translation of JP 61–167532A (Derwent Acc No 1986–236747) No Month.*
Derwent Abstract Translation of JP 63–039374A (Derwent Acc No. 1988–088181) No Month.*

* cited by examiner

*Primary Examiner*—Paul Thibodeau
*Assistant Examiner*—Kevin M Bernatz
(74) *Attorney, Agent, or Firm*—Sughrue Mion, PLLC

(57) ABSTRACT

A biaxially oriented polyester film for magnetic recording media which has (1) a Young's modulus in a machine direction of 5.0 GPa or less and a Young's modulus in a direction perpendicular to the machine direction of 8.0 GPa or more, (2) a surface roughness on one side of 0.3 to 1.5 nm when measured for a measurement area of 246.6×187.5 μm and 0.1 to 3.0 nm when measured for a measurement area of 2.5×1.9 mm and a surface roughness on the other side of 0.6 to 2.5 nm when measured for a measurement area of 246.6×187.5 μm and 0.1 to 5.0 nm when measured for a measurement area of 2.5×1.9 mm, and, (3) controlled heat shrinkage factors in the machine and transverse directions at 105° C. and 150° C.

10 Claims, No Drawings

POLYESTER FILM WITH SPECIFIED SURFACE ROUGHNESS, YOUNG'S MODULUS AND HEAT SHRINKAGE FOR USE AS SUBSTRATE FOR MAGNETIC RECORDING MEDIUM

DETAILED DESCRIPTION OF THE INVENTION

The present invention relates to a biaxially oriented polyester film for magnetic recording media and to a magnetic recording medium. More specifically, it relates to a biaxially oriented polyester film suitable for use as a base film for ferromagnetic metal thin film magnetic recording media which can record a large volume of digital data for a long time, such as a digital video cassette tape and a data storage tape and to a magnetic recording medium.

A digital video cassette tape (DVC tape) for general consumers which was implemented in 1995 comprises a base film which is more flat than a base film for Hi8ME tapes to provide greater magnetic force than Hi8ME tapes, a Co metal magnetic thin film and not Co/Ni alloy metal thin film formed on the base film and a diamond-like carbon film formed on the surface of the magnetic thin film to provide high running durability.

This base film comprises, for example, a polyester film and a discontinuous film which is essentially composed of a polymer blend closely bonded to at least one side of the above film and fine particles having a particle diameter of 50 to 500 Å. A polyester film containing a water-soluble polyester copolymer and having fine protrusions formed on the surface by the fine particles is used as the discontinuous film (for example, JP-B 63-57238) (the term "JP-B" as used herein means an "examined Japanese patent publication") and the metal magnetic film forming surface thereof has smaller roughness than that of a base film for Hi8ME tapes The base film must have a small thickness of less than 7 μm.

However, this very thin and flat base film is difficult to be handled in film formation and deposition steps. For instance, as the surface of the film is heated in the deposition step of a metal thin film layer, the deformation of the film by heat is prevented by closely contacting the surface of the film to a cooling drum. If the above line speed is accelerated, a conventional base film for magnetic recording media is not fully cooled on the surface of the drum, thereby causing a heat yielding phenomenon and the breakage of the film in the worst case. Even if the film is not broken, the base film is wrinkled, resulting in nonuniform deposition. Even when the obtained magnetic tape has excellent initial output, the output of the tape after long-term storage or after repeated running tends to lower. When the conventional base film is used as a base film for long-time recording video tapes, the edges of a tape are damaged during recording and reproduction, whereby the flatness of the tape is apt to become unsatisfactory.

It is an object of the present invention to provide a biaxially oriented polyester film for magnetic recording media which has excellent handling properties provides a magnetic tape having excellent output after storage or repeated running and prevents the edges of the tape from being damaged.

It is another object of the present invention to provide a polyester film for magnetic recording media which has sufficient slipperiness to enable the acceleration of the line speed and sufficient adhesion to a cooling drum at the time of deposition to prevent a heat yielding phenomenon and is free from a reduction in output caused by shape transfer to the surface of a magnetic layer in the production process of a metal thin film magnetic recording medium.

Other objects and advantages of the present invention will become apparent from the following description.

According to the present invention, firstly, the above objects and advantages of the present invention are attained by a biaxially oriented polyester film for magnetic recording media which has (1) a Young's modulus in a machine direction of 5.0 GPa or less and a Young's modulus in a direction perpendicular to the above machine direction of 8.0 GPa or more, (2) a surface roughness on one side of 0.3 to 1.5 nm when measured for a measurement area of 246.6×187.5 μm and 0.1 to 3.0 nm when measured for a measurement area of 2.5×1.9 mm and a surface roughness on the other side of 0.6 to 2.5 nm when measured for a measurement area of 246.6×187.5 μm and 0.1 to 5.0 nm when measured for a measurement area of 2.5×1.9 mm, and (3) a heat shrinkage factor in a machine direction when heated at 105° C. for 30 minutes of 0 to 1.5% and when heated at 150° C. for 30 minutes of 2.0 to 5.0% and a heat shrinkage factor in a direction perpendicular to the machine direction when heated at 105° C. for 30 minutes of 0.5 to 3.0% and when heated at 150° C. for 30 minutes of 6.0 to 11.0%.

Secondly, the above objects and advantages of the present invention are attained by a magnetic recording medium comprising the above biaxially oriented polyester film of the present invention and a magnetic layer formed on one side of the polyester film.

The present invention will be described in detail hereinafter.

The polyester which is the material of the biaxially oriented polyester film of the present invention is preferably an aromatic polyester for forming a high-strength film through molecular orientation. The aromatic polyester may be either a homopolyester or a copolyester. The homopolyester is preferably polyethylene terephthalate or polyethylene-2,6-naphthalene dicarboxylate. The copolyester may be a copolyester comprising ethylene terephthalate or ethylene-2,6-naphthalene dicarboxylate as the main recurring unit and a third component in an amount of 20 mol % or less, preferably 10 mol % or less based on the total of all the recurring units. Examples of the third component include diol components such as diethylene glycol, propylene glycol, neopentyl glycol, polyethylene glycol, p-xylylene glycol and 1,4-cyclohexane dimethanol, dicarboxylic acid components such as adipic acid, sebacic acid, phthalic acid, isophthalic acid and 5-sodium sulfoisophthalic acid, polycarboxylic acid components such as trimellitic acid and pyromellitic acid, and p-oxyethoxybenzoic acid.

The above polyester may contain a film formation modifier (for example, alkali metal salt compound, quaternary phosphonium sulfonate compound, etc.), thermal stabilizer (for example, phosphoric acid, phosphorous acid, derivative thereof, etc.), antioxidant (for example, hindered phenol-based compound, etc.) and other additives as required in limits that do not impair the object of the present invention.

The intrinsic viscosity of the above polyester (measured at 25° C. in orthochlorophenol by an Ostwald's viscometer) is preferably 0.4 to 0.9.

The biaxially oriented polyester film of the present invention has a Young's modulus in a machine direction of 5.0 GPa or less, preferably 4.8 GPa or less and a Young's modulus in a direction perpendicular to the machine direction of 8.0 GPa or more, preferably 9.0 GPa or more. The Young's modulus in the machine direction is more preferably 3 GPa or more and the Young's modulus in a direction perpendicular to the machine direction is more preferably 18 GPa or less. When the Young's modulus in the machine direction is larger than 5.0 GPa and a digital magnetic tape is formed from the polyester film, a sound generated by beating the tape by the rotating head of a digital video recorder resonates disadvantageously. When the Young's modulus in the direction perpendicular to the machine direction is smaller than 8.0 GPa, the obtained magnetic tape does not contact the head properly, resulting in an output reduction.

The biaxially oriented polyester film of the present invention has the following surface characteristics.

The surface roughness of one side (to be referred to as "side A" hereinafter) of the biaxially oriented polyester film is 0.3 to 1.5 nm when measured for a measurement area of 246.6×187.5 μm (to be referred to as "WRa(25)A" hereinafter) and 0.1 to 3.0 nm when measured for a measurement area of 2.5×1.9 mm (to be referred to as "WRa(2.5)A" hereinafter) and the surface roughness of the other side (to be referred to as "side B" hereinafter) is 0.6 to 2.5 μm when measured for a measurement area of 246.6×187.5 μm (to be referred to as "WRa(25)B" hereinafter) and 0.1 to 5.0 nm when measured for a measurement area of 2.5×1.9 mm (to be referred to as "WRa(2.5)B" hereinafter). WRa(25)A is preferably 0.3 to 1.0 nm and WRa(25)B is preferably 0.6 to 1.8 nm.

Preferably, the side A is a side on which the magnetic layer is formed and the side B is a side opposite to the side A. In this case, the surface roughness of the side B is preferably larger than the surface roughness of the side A. When WRa(25)A is smaller than 0.3 nm, the friction with the head of the obtained magnetic tape becomes large, causing a running failure and when WRa(25)A is larger than 1.5 nm, the output of the obtained magnetic tape becomes insufficient. When WRa(25)B is smaller than 0.6 nm, the friction coefficient becomes large, resulting in deterioration in handling properties of the film and when WRa(25)B is larger than 2.5 nm, a heat yielding phenomenon occurs at the time of deposition and the rough surface of the side B is shape transferred to the side A, thereby roughening the surface of the side A when the film is rolled. When WRa(2.5)A and WRa(2.5)B are smaller than 0.1 nm, the friction coefficient becomes large, resulting in deterioration in handling properties of the film.

The surface roughness is in the following two modes (i) and (ii).

(i) The surface roughness of one side A is 0.3 to 1.5 nm when measured for a measurement area of 246.6×187.5 μm (WRa(25)A) and 0.1 to 2.0 nm when measured for a measurement area of 2.5×1.9 mm (WRa(2.5)A). Meanwhile, the surface roughness of the other side B is 0.6 to 2.5 nm when measured for a measurement area of 246.6×187.5 μm (WRa(25)B) and 0.1 to 2.0 nm when measured for a measurement area of 2.5×1.9 mm (WRa(2.5)B).

(ii) The surface roughness of one side A is 0.3 to 1.5 nm when measured for a measurement area of 246.6×187.5 μm (WRa(25)A) and 0.5 to 3.0 nm when measured for a measurement area of 2.5×1.9 mm (WRa(2.5)A). Meanwhile, the surface roughness of the other side B is 0.6 to 2.5 nm when measured for a measurement area of 246.6×187.5 μm (WRa(25)B) and 2.0 to 5.0 nm when measured for a measurement area of 2.5×1.9 mm (WRa(2.5)B).

When WRa(2.5)A and WRa(2.5)B are larger than 2.0 nm in the above mode (i), such inconvenience easily occurs as insufficient output of the obtained magnetic tape, a heat yielding phenomenon at the time of deposition, or the shape transfer of the rough surface of the side B to the side A when the film is rolled.

When WRa(2.5)A is smaller than 0.5 nm in the above mode (ii), the running durability of the obtained magnetic tape tends to become unsatisfactory and when WRa(2.5)A is larger than 3.0 nm, the output of the obtained magnetic tape is apt to become insufficient disadvantageously. When WRa(2.5)B is smaller than 2.0 nm, the friction coefficient rises, resulting in deterioration in handling properties of the film and when WRa(2.5)B is larger than 5.0 nm, the rough surface of the side B is shape transferred to the side A, thereby being apt to roughen the surface of the side A when the film is rolled.

When a coating layer is formed on the surface of the film before deposition, the surface roughness of the polyester film is the surface roughness of the coating layer. In this case, WRa(2.5) values are rarely affected by the coating layer and the surface roughness of the polyester film is substantially the same as the surface roughness of the base film.

It is desired that the polyester for forming the side A on which the magnetic layer is formed of the polyester film in the present invention should contain substantially no particles or contain fine particles having an average particle diameter of preferably 30 to 150 nm, more preferably 40 to 100 nm, in an amount of preferably 0.1 wt % or less, more preferably 0.06 wt % or less. The above fine particles are desirably contained from the viewpoint of the durability of the magnetic layer.

It is desired that a coating layer made from an organic compound containing fine particles having an average particle diameter of preferably 5 to 30 nm, more preferably 8 to 30 nm in an amount of preferably 0.5 to 12.0 wt %, more preferably 0.6 to 10.0 wt % should be formed on the side A of the above polyester film to improve slipperiness. Preferred examples of the fine particles include silica, calcium carbonate, alumina, polyacrylic particles and polystyrene particles. Preferred examples of the organic compound include polar polymers such as water-soluble (or water-dispersible) polyesters, polyurethanes and acrylic resins, and blends thereof. The thickness of the coating layer is preferably 1 to 30 nm.

On the non-magnetic layer side B of the polyester film of the present invention, WRa(2.5)B is preferably larger than WRa(2.5)A. The method of roughening only the side B in a WRa(2.5) wide area of 2.5×1.9 mm is not particularly limited but a method in which only the surface (side B) in contact with a casting drum is made uneven by solidifying the molten and extruded polyester on the casting drum having a fine uneven surface by cooling to produce a polyester film is preferably employed. The method of roughening only the side B in a WRa(25) area (246.6×187.5 μm) is not particularly limited but a method in which a coating layer having a rougher surface than the side A is formed on the side B of a polyester film, a method in which a polyester film layer (layer on the side B) containing fine particles is formed on one side of a polyester film layer (layer on the side A) containing no fine particles, a method in which two different polyester film layers which differ from each other in the type and average particle diameter and/or content of fine particles are laminated together, and the like are employed.

The formation of the above coating layer may be carried out in accordance with the method in which a coating layer is formed on the side A. The surface is preferably roughened by using fine particles (for example, polyethylene particles, polyacrylic particles, silicone resin particles, calcium carbonate, silica, alumina, etc.) having an average particle diameter of preferably 10 to 200 nm, more preferably 20 to 100 nm in an amount of preferably 5 to 40 wt %, more preferably 10 to 30 wt % in combination with or independently of a resin having poor extensibility such as polyvinyl alcohol, gelatin, cellulose or sulfonic acid base containing styrene copolymer as part (5 to 50 wt %, specifically 10 to 40 wt %) of a binder resin.

Any conventionally known binder resin may be used as the binder resin, as exemplified by water-soluble (or water-dispersible) polyesters, polyurethanes, acrylic resins and the like. The thickness of the coating layer is preferably 3 to 50 nm, more preferably 5 to 30 nm.

The method of laminating the polyester film layer is preferably a co-extrusion method. The thickness of the polyester film layer forming the side B is preferably ½ to ⅒ the total thickness of the film. Examples of the fine particles used in the polyester film layer forming the side B include calcium carbonate, silica, alumina, polystyrene particles, silicone resin particles and the like. The average particle diameter of the fine particles is preferably 50 to 500 nm, more preferably 60 to 300 nm. The amount of the fine particles is preferably 0.05 to 0.3 wt %, more preferably 0.08. to 0.2 wt %.

The biaxially oriented polyester film of the present invention has a heat shrinkage factor in a machine direction when heated at 105° C. for 30 minutes of 0 to 1.5% and when heated at 150° C. for 30 minutes of 2.0 to 5.0% and a heat shrinkage factor in a direction perpendicular to the machine direction when heated at 105° C. for 30 minutes of 0.5 to 3.0% and when heated at 150° C. for 30 minutes of 6.0 to 11.0%.

If the heat shrinkage factor when heated at 150° C. for 30 minutes is outside the above range, there will be a difference in the amount of shrinkage between a magnetic thin film layer and a polyester film heated at the time of deposition when a deposited tape is produced, whereby the magnetic tape is curled and does not contact the head properly disadvantageously.

If the heat shrinkage factor when heated at 105° C. for 30 minutes is outside the above range, the obtained magnetic tape changes in size after it is stored at a high temperature, thereby causing so-called "track deviation" and a reduction in output disadvantageously.

The thickness of the polyester film of the present invention is preferably 2 μm or more and less than 7 μm. The material of the polyester film is particularly preferably polyethylene terephthalate or polyethylene-2,6-naphthalene dicarboxylate.

The polyester film of the present invention can be produced in accordance with methods conventionally known or accumulated by the industry. For example, a polyester is extruded into the form of a sheet using a known extruder at a temperature of (Tm) to (Tm+70)° C. (Tm: melting point) and solidified by quenching at 40 to 90° C. to produce an unstretched film. Thereafter, the unstretched film is stretched in a uniaxial direction (machine direction or transverse direction) to 2.5 to 4.5 times, preferably 2.8 to 3.9 times, at a temperature of approximately (Tg−10) to (Tg+70)° C. (Tg: glass transition temperature of the polyester) in accordance with a commonly used method. After a predetermined coating layer is formed by applying a coating to one side or both sides of the film and drying it or while drying it, the film is stretched in a direction perpendicular to the above direction to 4.5 to 8.0 times, preferably 4.5 to 6.0 times at a temperature of approximately Tg to (Tg+70)° C. and further stretched again in a machine direction and/or transverse direction as required to produce a biaxially oriented film. That is, two-stage, three-stage, four-stage, or multi-stage orientation may be carried out. The total draw ratio is generally 12 times or more, preferably 12 to 32 times, more preferably 14 to 26 times in terms of area draw ratio. Subsequently, the biaxially oriented film is heat set at a temperature of (Tg+70) to (Tm−10)° C., for example, 180 to 250° C. for crystallization to provide excellent dimensional stability. The heat setting time is preferably 1 to 60 seconds. In this heat setting, the film is preferably relaxed in a machine direction and/or transverse direction by 3.0% or less, specifically 0.5 to 2.0% to adjust heat shrinkage factor.

The above method is to form a coating layer on one side or both sides of a single-layer film. When a polyester film layer containing fine particles is formed on the side B of the film in place of the coating layer, a co-extrusion method is preferably used. This co-extrusion method may be carried out in the same manner as in the case of a single-layer film except that a polyester forming the side A and a polyester forming the side B are laminated together in a die, co-extruded and solidified by quenching at 40 to 90° C. to produce a laminated unstretched film.

The polyester film of the present invention has the above characteristic properties particularly suitable for metal deposition operation. A magnetic layer, for example, a ferromagnetic:metal thin film layer may be formed on the side A (coating layer when formed) by vacuum deposition. Any known metal may be used as this metal without restriction. However, the metal is preferably iron, cobalt, nickel or ferromagnetic alloy thereof. This metal thin film is desirably coated with a diamond-like carbon film having a thickness of approximately 10 nm. The thickness of the metal thin film layer. is 100 to 300 nm.

On the side B of the polyester film, a back coat layer may be formed by coating a solution of solid fine particles and a binder and optionally additives after the metal deposition operation. Known solid fine particles, binder and additives may be used without restriction. The thickness of the back coat layer is approximately 0.3 to 1.5 µm.

The polyester film of the present invention is suitable for use as a base film for magnetic recording media because excellent results are obtained particularly when it is used in a long-time recording digital video tape. Excellent results can also be obtained even when the polyester film of the present invention is used in a data storage tape.

The characteristic properties and other properties of the film used in this specification or examples are measured by the following methods and defined.

(1) Intrinsic Viscosity of Polyester

The polyester is dissolved in orthochlorophenol and the intrinsic viscosity of the polyester is obtained by an Ostwald's viscometer. The viscosity measurement temperature is 25° C.

(2) Surface Roughness of Film (1) WRa(2.5)

Using a non-contact 3-D surface roughness meter (NT-2000 of WYKO Co., Ltd.), 10 or more measurements are made under such conditions as a measurement area of 2.5×1.9 mm (=4.75 mm$^2$) and a measurement magnification of 2.5× to measure the surface roughnesses of both sides A and B of the film and the center plane surface average roughness (WRa(2.5)) is calculated with surface analysis software incorporated in the roughness meter.

$$WRa = \sum_{k=1}^{m} \sum_{j=1}^{n} |Z_{jk} - \bar{Z}| / (m \cdot n)$$

provided $$\bar{Z} = \sum_{k=1}^{m} \sum_{j=1}^{n} Z_{jk} / (m \cdot n)$$

$Z_{jk}$ is the height of a 2-D roughness chart at a j-th position and a k-th position in a measurement direction (2.5 mm) and a direction perpendicular to the measurement direction (1.9 mm) when these directions are divided into m and n sections, respectively.

(2) WRa(25)

Using a non-contact 3-D surface roughness meter (NT-2000 of WYKO Co., Ltd.), 10 or more measurements are made under such conditions as a measurement area of 246.6×187.5 µm (=0.0462 mm$^2$) and a measurement magnification of 25× to measure the surface average roughnesses of both sides A and B of the film and the center plane surface average roughness (WRa(25)) is calculated with surface analysis software incorporated in the roughness meter.

$$WRa = \sum_{k=1}^{m} \sum_{j=1}^{n} |Z_{jk} - \bar{Z}| / (m \cdot n)$$

provided $$\bar{Z} = \sum_{k=1}^{m} \sum_{j=1}^{n} Z_{jk} / (m \cdot n)$$

$Z_{jk}$ is the height of a 2-D roughness chart at a j-th position and a k-th position in a measurement direction (246.6 µm) and a direction perpendicular to the measurement direction (187.5 µm) when these directions are divided into m and n sections, respectively.

(3) Young's Moduli of Film

The film is cut to a width of 10 mm and a length of 15 cm, and this sample is pulled by an Instron type universal tensile tester at a chuck interval of 100 mm, a pulling rate of 10 mm/min and a chart rate of 500 mm/min. The Young's modulus is calculated from the tangent of a rising portion of the obtained load-elongation curve.

(4) Heat Shrinkage Factors at 105° C. for 30 Minutes and 150° C. for 30 Minutes of Film A 10 mm wide and 30 cm long sample is heated in an oven at respective temperatures for 30 minutes and the difference in length after heat shrinkage is measured and divided by the original length and multiplied by 100 to obtain heat shrinkage factor (%).

(5) Friction Coefficient (µk) of Film

A ½-inch wide tape obtained by slitting the film is caused to run at 20° C. and 60%RH using the SFT-700 tape running tester (of Yokohama System Kenkyusho Co., Ltd.) to obtain its initial friction coefficient from the following equation.

$$\mu k = 2/\pi ln(T_2/T_1)$$

wherein $T_1$ is an input tension and $T_2$ is an output tension.

The diameter of a guide is 6 mm, the material of the guide is SUS27 (surface roughness of 0.2 S), the winding angle is 90° and the running speed is 3.3 cm/sec. The friction coefficient is judged based on the following criteria.

○: less than 0.5
×: 0.5 or more (6) Friction Coefficient of Film

A glass plate is fixed under a set of two films, a lower film (film in contact with the glass plate) of the set is pulled with a constant speed roll (10 cm/min), and a detector is fixed at one end of an upper film (opposite end in the pulling direction of the lower film) to detect tensile force (F) between the films. A sled placed on the upper film has a lower area of 50 cm$^2$ (80×62.5 mm), the surface in contact with the film of the sled is made from 80° neoprene rubber, and the weight (W) of the sled is 1.2 kg.

The coefficient of static friction is obtained from the following equation and evaluated based on the following criteria.

$$\mu s = F(g)/W(g)$$

criteria:
○: less than 0.4
Δ: 0.4 or more and less than 0.6
×: 0.6 or more (7) Heat Yielding of Film A 200 nm thick deposition layer of Co—Ni alloy (20 wt % of Ni) is formed on a 500 mm wide long film in the presence of a trace amount of oxygen using a continuous vacuum deposition apparatus. The heat yielding of the film is judged based on how many times the film is molten and broken by yielding to heat when the temperature of a cooling drum is set to 70° C., the deposition speed is set to 100 m/min and deposition is made on a 9,000 m long film roll.
○: none
Δ: once
×: two or more times (8) Output of Magnetic Tape (1)

A 200 nm thick deposition layer of Co—Ni alloy (20 wt % of Ni) is formed on the film in the presence of a trace amount of oxygen using a continuous vacuum deposition apparatus. Further, a carbon protective layer is formed on the surface of the deposition layer by known means and the resulting film is slit to a width of 8 mm to produce a pancake. A 200 m portion of this pan cake is stored in a cassette to prepare a cassette tape.

The C/N of this tape is measured at 7 MHz±1 MHz using a commercially available Hi8 VTR (EV-BS3000 of Sony Corporation).

The output right after the production of the tape is taken as initial output and the output after 10 days of storage at 60° C. is taken as output after storage and compared with that of a commercially available Hi8 video tape (120-minute ME) and judged based on the following criteria.
○: +3 dB or more
Δ: +1 dB or more and less than +3 dB
×: less than +1 dB (9) Output of Magnetic Tape (2)

The output characteristics of a magnetic tape having a ferromagnetic thin film are measured using a commercially available 8 mm video tape recorder of Hi8 system. As for output characteristics (video S/N ratio), signals from a TV test signal generator are supplied to the 8 mm video tape recorder of Hi8 system and compared with those of a commercially available standard Hi8ME tape as 0 dB using a video noise meter.

The output right after the production of the magnetic tape is taken as initial output, the output after 10 days of storage at 60° C. is taken as output after storage, and the output after running 100 times repeatedly is taken as output after running and evaluated based on the following criteria.
○: +2 dB or more
Δ: 0 to less than +2 dB
×: less than 0 dB It is also observed whether a sound generated by beating the tape with the head resonates or not in an image recorded state.
○: not resonates
×: resonates The following examples are given to further illustrate the present invention.

EXAMPLE 1

Pellets of polyethylene-2,6-naphthalene dicarboxylate containing substantially no inert particles (intrinsic viscosity of 0.6) were dried at 170° C. for 6 hours and supplied to an extruder to be molten at 305° C. This molten polymer was filtered by a commonly used method and extruded from a die into. the form of a sheet. This sheet was wound round a casting drum having a surface temperature of 60° C. to be solidified by cooling in accordance with an electrostatic casting method to produce an unstretched film. Subsequently, this unstretched film was preheated at 120° C. and stretched to 3.7 times in a longitudinal direction between low-speed and high-speed rolls by heating with an IR heater at 900° C. 15 mm from above, and then an aqueous solution (coating) having composition shown below was coated on the film. coating for side A:

80 parts by weight of a copolyester (terephthalic acid/ isophthalic acid/5-sodium sulfoisophthalic acid// ethylene glycol/bisphenol A adduct with 2 moles of propione oxide=97/1/2//60/40)

5 parts by weight of acrylic resin particles (average particle diameter of 20 nm)

15 parts by weight of Nonion NS-240 of NOF Corporation solids content: 1.0 wt % thickness of coating layer (after drying): 6 nm coating for side B:

60 parts by weight of a copolyester (terephthalic acid/ isophthalic acid/5-sodium sulfoisophthalic acid// ethylene glycol/bisphenol A adduct with 2 moles of propione oxide=97/1/2//60/40)

10 parts by weight of silica particles (average particle diameter of 60 nm)

20 parts by weight of hydroxypropylmethyl cellulose 10 parts by weight of Nonion NS-208.5 of NOF Corporation solids content: 2.5 wt % thickness of coating layer (after drying): 15 nm

Subsequently, the film was supplied to a stenter to be stretched to 4.9 times in a transverse direction at 150° C., heated at 200° C. while it was towed out to 1.14 times in a transverse direction and relaxed by 1.2% in a transverse direction at 180° C. to produce a biaxially oriented film having a thickness of 4.7 μm. A deposition layer was formed on the surface of this polyester film by the above method (8) to produce a magnetic tape. The characteristic properties of the obtained polyester film and magnetic tape are shown in Table 1.

EXAMPLE 2

A 6.4 μm thick polyester film was obtained in the same manner as in Example 1 except that polyethylene terephthalate was used in place of polyethylene-2,6-naphthalene dicarboxylate, the drying time was changed to 3 hours, the melt extrusion temperature was changed to 295° C., the surface temperature of the casting drum was changed to 20° C., and the film was stretched to 3.0 times in a longitudinal direction at 110° C. and to 3.3 times in a transverse direction at 105° C., heated at 210° C. while it was towed out to 1.6 times in a transverse direction, and relaxed by 1.0% in a transverse direction at 170° C. in the production of the base film of Example 1. A magnetic tape was then produced in the same manner as in Example 1. The characteristic properties of the obtained polyester film and magnetic tape are shown in Table 1.

EXAMPLE 3

A 4.7 μm thick polyester film was obtained in the same manner as in Example 1 except that raw material A which was polyethylene-2,6-naphthalene dicarboxylate containing substantially no inert particles and raw material B obtained by containing 0.15 wt % of silica having an average particle diameter of 200 nm in polyethylene-2,6-naphthalene dicarboxylate containing substantially no inert particles were co-extruded in a thickness ratio of 5:1 in the production of the base film of Example 1. A magnetic tape was then produced in the same manner as in Example 1. The characteristic properties of the obtained polyester film and magnetic tape are shown in Table 1.

Comparative Example 1

A 4.7 µm thick polyester film was obtained in the same manner as in Example 3 except that raw material B obtained by containing 0.5 wt % of silica having an average particle diameter of 300 nm in polyethylene-2,6-naphthalene dicarboxylate containing substantially no inert particles was used in the production of the base film of Example 3. A magnetic tape was then produced in the same manner as in Example 1. The characteristic properties of the obtained polyester film and magnetic tape are shown in Table 1.

Comparative Example 2

A 4.7 µm thick polyester film was obtained in the same manner as in Example 1 except that a coating layer was not formed on the side B in the production of the base film of Example 1 and a magnetic tape was then produced in the same manner as in Example 1. The characteristic properties of the obtained polyester film and magnetic tape are shown in Table 1. Since the obtained polyester film had a large friction coefficient and poor handling properties in the deposition step, deposition was impossible.

Comparative Example 3

A 4.7 µm thick polyester film was obtained in the same manner as in Example 1 except that the draw ratio in a longitudinal direction was changed to 4.0 times, the draw ratio in a transverse direction was changed to 4.5 times, and the relaxation ratio in a transverse direction was changed to 0.9% in the production of the base film of Example 1, and a magnetic tape was then produced in the same manner as in Example 1. The characteristic properties of the obtained polyester film and magnetic tape are shown in Table 1.

Comparative Example 4

A 6.4 µm thick polyester film was obtained in the same manner as in Example 2 except that the draw ratio in a longitudinal direction was changed to 3.5 times, the draw ratio in a transverse direction was changed to 2.8 times, and the relaxation ratio in a transverse direction was changed to 0.9% in the production of the base film of Example 2, and a magnetic tape was then produced in the same manner as in Example 1. The characteristic properties of the obtained polyester film and magnetic tape are shown in Table 1. The obtained magnetic tape had such problems as improper contact with the head and insufficient output.

Comparative Example 5

A 6.4 µm thick polyester film was obtained in the same manner as in Example 2 except that the heat treatment temperature after stretching in a transverse direction was changed to 195° C. in the production of the base film of Example 2, and a magnetic tape was then produced in the same manner as in Example 1. The characteristic properties of the obtained polyester film and magnetic tape are shown in Table Comparative Example 6

A 4.7 µm thick polyester film was obtained in the same manner as in Example 1 except that the heat treatment temperature after stretching in a transverse direction was changed to 230° C. in the production of the base film of Example 1, and a magnetic tape was then produced in the same manner as in Example 1. The characteristic properties of the obtained polyester film and magnetic tape are shown in Table 1. The obtained tape was greatly curled toward the magnetic layer in both longitudinal and transverse directions of the tape.

TABLE 1

| | film formation conditions | | | | | | | |
|---|---|---|---|---|---|---|---|---|
| | draw ratio | | | | | temperature (° C.) | | |
| | draw ratio in longitudinal direction | draw ratio in transverse direction | tow-out | relaxation ratio (%) | substantial draw ratio in transverse direction | transverse stretching temperature | heat setting temperature | relaxation temperature |
| Ex. 1 | 3.7 | 4.9 | 1.14 | 1.20 | 5.5 | 150 | 200 | 180 |
| Ex. 2 | 3.0 | 3.3 | 1.60 | 1.20 | 5.2 | 105 | 210 | 170 |
| Ex. 3 | 3.7 | 4.9 | 1.14 | 1.20 | 5.5 | 150 | 200 | 180 |
| C. Ex. 1 | 3.7 | 4.9 | 1.14 | 1.20 | 5.5 | 150 | 200 | 180 |
| C. Ex. 2 | 3.7 | 4.9 | 1.14 | 1.20 | 5.5 | 150 | 200 | 180 |
| C. Ex. 3 | 4.0 | 4.5 | 1.14 | 0.90 | 5.1 | 150 | 200 | 180 |
| C. Ex. 4 | 3.5 | 2.8 | 1.60 | 0.90 | 4.4 | 105 | 210 | 170 |
| C. Ex. 5 | 3.0 | 3.3 | 1.60 | 1.20 | 5.2 | 105 | 195 | 170 |
| C. Ex. 6 | 3.7 | 4.9 | 1.14 | 1.20 | 5.5 | 150 | 230 | 180 |

| characteristic properties of base film | | | | |
|---|---|---|---|---|
| WRa | WRa | Young's | heat shrinkage | heat shrinkage |

TABLE 1-continued

|  | (2.5 times) | | (25 times) | | moduli | | factor at 105° C. | | factor at 150° C. | |
| --- | --- | --- | --- | --- | --- | --- | --- | --- | --- | --- |
|  | side A nm | side B nm | side A nm | side B nm | MD GPa | TD GPa | MD % | TD % | MD % | TD % |
| Ex. 1 | 0.6 | 0.6 | 0.4 | 0.7 | 4.5 | 10.0 | 0.6 | 0.7 | 3.0 | 9.0 |
| Ex. 2 | 0.7 | 0.9 | 0.5 | 0.7 | 4.6 | 8.2 | 1.2 | 2.8 | 2.5 | 6.9 |
| Ex. 3 | 1.1 | 1.8 | 0.9 | 1.8 | 4.5 | 10.0 | 0.6 | 0.7 | 3.0 | 9.0 |
| C. Ex. 1 | 1.5 | 3.1 | 1.2 | 3.0 | 4.5 | 10.0 | 0.6 | 0.7 | 3.0 | 9.0 |
| C. Ex. 2 | 0.6 | 0.6 | 0.4 | 0.4 | 4.5 | 10.0 | 0.6 | 0.7 | 3.0 | 9.0 |
| C. Ex. 3 | 0.6 | 0.6 | 0.5 | 0.8 | 6.0 | 9.0 | 0.8 | 0.7 | 4.0 | 6.8 |
| C. Ex. 4 | 0.7 | 0.9 | 0.6 | 0.8 | 4.8 | 7.0 | 1.1 | 2.1 | 2.7 | 3.7 |
| C. Ex. 5 | 0.8 | 0.8 | 0.6 | 0.7 | 4.7 | 8.8 | 1.3 | 3.9 | 3.6 | 7.6 |
| C. Ex. 6 | 0.8 | 0.6 | 0.6 | 0.8 | 4.3 | 9.7 | 0.5 | 0.6 | 1.0 | 4.5 |

|  | characteristic properties of film friction coefficient | characteristic properties of tape | | | |
| --- | --- | --- | --- | --- | --- |
|  |  | heat yielding | initial output | output after storage | resonance at the time of recording |
| Ex. 1 | ○ | ○ | ○ | ○ | ○ |
| Ex. 2 | ○ | ○ | ○ | ○ | ○ |
| Ex. 3 | ○ | ○ | Δ | Δ | ○ |
| C. Ex. 1 | ○ | × | × | × | ○ |
| C. Ex. 2 | × | — | — | — | — |
| C. Ex. 3 | ○ | ○ | ○ | ○ | × |
| C. Ex. 4 | ○ | ○ | × | × | ○ |
| C. Ex. 5 | ○ | ○ | ○ | × | ○ |
| C. Ex. 6 | ○ | ○ | × | × | ○ |

Ex.: Example
C. Ex.: Comparative Example

As obvious from Table 1, the polyester film of the present invention has excellent handling properties with a small friction coefficient, is free from a heat yielding phenomenon at the time of deposition and can provide a magnetic tape free from a reduction in output caused by shape transfer to a surface of a magnetic layer.

EXAMPLE 4

Pellets of polyethylene-2,6-naphthalene dicarboxylate containing substantially no inert particles (intrinsic viscosity of 0.6) were dried at 170° C. for 6 hours and supplied to an extruder to be molten at 305° C. This molten polymer was filtered by a commonly used method and extruded from a die into the form of a sheet. This sheet was wound round a casting drum having a surface temperature of 60° C. and a finely cracked surface in such a manner that the surface in contact with the drum was situated on the non-magnetic side B of the sheet to be solidified by cooling in accordance with an electrostatic casting method so as to produce an unstretched film. Subsequently, this unstretched film was preheated at 120° C. and stretched to 3.7 times in a longitudinal direction between low-speed and high-speed rolls by heating with an IR heater at 900° C. 15 mm from above, and then the same aqueous solution (coating) as used in Example 1 was coated on the film.

Subsequently, the film was supplied to a stenter to be stretched to 4.9 times in a transverse direction at 150° C., heated at 200° C. while it was towed out to 1.14 times in a transverse direction and relaxed by 1.2% in a transverse direction at 180° C. to produce a biaxially oriented film having a thickness of 4.7 μm. A 110 nm thick Co-oxygen thin film was formed on the surface (side A) of this polyester film under vacuum. A 10 nm thick diamond-like carbon film was then formed on this Co-oxygen thin film layer by sputtering. Thereafter, a 500 nm thick back coat layer made from carbon black, polyurethane and silicone was formed on the side B and the resulting film was slit to a width of 8 mm by a slitter and wound round a reel to produce a magnetic tape in accordance with the above method (9). The characteristic properties of the obtained polyester film and magnetic tape are shown in Table 2.

EXAMPLE 5

A 6.4 μm thick polyester film was obtained in the same manner as in Example 4 except that polyethylene terephthalate (intrinsic viscosity of 0.54) was used in place of polyethylene-2,6-naphthalene dicarboxylate, the pellet drying time was: changed to 3 hours, the melt extrusion temperature was changed to 295° C., the surface temperature of the casting drum was changed to 20° C., and the film was stretched to 3.0 times in a longitudinal direction at 110° C. and to 3.3 times in a transverse direction at 105° C., heated at 210° C. while it was towed out to 1.6 times in a transverse direction, and relaxed by 1.0% in a transverse direction at 170° C. in the production of the base film of Example 4. A magnetic tape was then produced in the same manner as in Example 4. The characteristic properties of the obtained polyester film and magnetic tape are shown in Table 2.

EXAMPLE 6

A 4.7 μm thick polyester film was obtained in the same manner as in Example 4 except that raw material A which was polyethylene-2,6-naphthalene dicarboxylate containing substantially no inert particles and raw material B obtained by containing 0.3 wt % of silica having an average particle diameter of 300 nm in polyethylene-2,6-naphthalene dicarboxylate containing substantially no inert particles were co-extruded in a thickness ratio of 5:1 in the production of the base film of Example 4. A magnetic tape was then produced in the same manner as in Example 4. The characteristic properties of the obtained polyester film and magnetic tape are shown in Table 2.

EXAMPLE 7

A 6.4 μm thick polyester film was obtained in the same manner as in Example 5 except that raw material A which was polyethylene terephthalate containing substantially no inert particles and raw material B obtained by containing 0.3 wt % of silica having an average particle diameter of 200 nm in polyethylene terephthalate containing substantially no inert particles were co-extruded in a thickness ratio of 5:1 in the production of the base film of Example 5. A magnetic tape was then produced in the same manner as in Example 4. The characteristic properties of the obtained polyester film and magnetic tape are shown in Table 2.

Comparative Example 7

A 4.7 μm thick polyester film was obtained in the same manner as in Example 4 except that the film was stretched to 4.0 times in a longitudinal direction and to 4.5 times in a transverse direction at 150° C. and further towed out to 1.14 times in a transverse direction at 200° C. in the production of the base film of Example 4, and a magnetic tape was then produced in the same manner as in Example 4. The characteristic properties of the obtained polyester film and magnetic tape are shown in Table 2.

Comparative Example 8

A 6.4 μm thick polyester film was obtained in the same manner as in Example 5 except that the film was stretched to 3.5 times in a longitudinal direction and then to 2.8 times in a transverse direction at 105° C. and further towed out to 1.6 times in a transverse direction at 210° C. in the production of the base film of Example 5, and a magnetic tape was then produced in the same manner as in Example 4. The characteristic properties of the obtained polyester film and magnetic tape are shown in Table 2. When the magnetic tape was observed after running, the edges of the tape were damaged.

Comparative Example 9

A 6.4 μm thick polyester film was obtained in the same manner as in Example 5 except that the film was stretched to 3.3 times in a transverse direction at 105° C. and further towed out to 1.6 times in a transverse direction at 195° C. in the production of the base film of Example 5, and a magnetic tape was then produced in the same manner as in Example 4. The characteristic properties of the obtained polyester film and magnetic tape are shown in Table 2.

Comparative Example 10

A 4.7 μm thick polyester film was obtained in the same manner as in Example 6 except that the raw material A was changed to a raw material obtained by containing 0.2 wt % of silica having an average particle diameter of 110 nm in polyethylene-2,6-naphthalene dicarboxylate containing no inert particles in the production of the base film of Example 6, and a magnetic tape was produced in the same manner as in Example 4. The characteristic properties of the obtained polyester film and magnetic tape are shown in Table 2.

Comparative Example 11

A 4.7 μm thick polyester film was obtained in the same manner as in Example 4 except that the heat treatment temperature after stretching in a transverse direction was changed to 230° C. in the production of the base film of Example 4, and a magnetic tape was then produced in the same manner as in Example 4. The characteristic properties of the obtained polyester film and magnetic tape are shown in Table 2. The obtained tape was greatly curled toward the magnetic layer in both longitudinal and transverse directions of the tape.

TABLE 2

| | film formation conditions | | | | | | | |
|---|---|---|---|---|---|---|---|---|
| | draw ratio | | | | | temperature (° C.) | | |
| | draw ratio in longitudinal direction | draw ratio in transverse direction | tow-out | relaxation ratio (%) | substantial draw ratio in transverse direction | transverse stretching temperature | heat setting temperature | relaxation temperature |
| Ex. 4 | 3.7 | 4.9 | 1.14 | 1.20 | 5.5 | 150 | 200 | 180 |
| Ex. 5 | 3.0 | 3.3 | 1.60 | 1.00 | 5.2 | 105 | 210 | 170 |
| Ex. 6 | 3.7 | 4.9 | 1.14 | 1.20 | 5.5 | 150 | 200 | 180 |
| Ex. 7 | 3.0 | 3.3 | 1.60 | 1.00 | 5.2 | 105 | 210 | 170 |
| C. Ex. 7 | 4.0 | 4.5 | 1.14 | 1.20 | 5.1 | 150 | 200 | 180 |
| C. Ex. 8 | 3.5 | 2.8 | 1.60 | 1.00 | 4.4 | 105 | 210 | 170 |
| C. Ex. 9 | 3.0 | 3.3 | 1.60 | 1.00 | 5.2 | 105 | 195 | 170 |
| C. Ex. 10 | 3.7 | 4.9 | 1.14 | 1.20 | 5.5 | 150 | 200 | 180 |
| C. Ex. 11 | 3.7 | 4.9 | 1.14 | 1.20 | 5.5 | 150 | 230 | 180 |

| characteristic properties of base film | | | | | | | | | |
|---|---|---|---|---|---|---|---|---|---|
| WRa (2.5 times) | | WRa (25 times) | | Young's moduli | | heat shrinkage factor at 105° C. | | heat shrinkage factor at 150° C. | |
| side A | side B | side A | side B | MD | TD | MD | TD | MD | TD |

TABLE 2-continued

|  | nm | nm | nm | nm | GPa | GPa | % | % | % | % |
|---|---|---|---|---|---|---|---|---|---|---|
| Ex. 4 | 1.7 | 2.9 | 0.4 | 1.2 | 4.5 | 10.0 | 0.6 | 0.7 | 3.0 | 9.0 |
| Ex. 5 | 1.6 | 3.1 | 0.5 | 1.5 | 4.6 | 8.3 | 1.2 | 2.8 | 2.5 | 7.1 |
| Ex. 6 | 2.5 | 4.5 | 1.2 | 2.3 | 4.5 | 10.0 | 0.6 | 0.7 | 3.0 | 9.0 |
| Ex. 7 | 2.8 | 4.7 | 1.1 | 2.0 | 4.6 | 8.3 | 1.2 | 2.8 | 2.5 | 7.1 |
| C. Ex. 7 | 1.8 | 3.0 | 0.4 | 1.3 | 6.0 | 9.0 | 0.6 | 0.8 | 3.5 | 8.0 |
| C. Ex. 8 | 1.6 | 2.9 | 0.5 | 1.5 | 4.2 | 7.2 | 1.1 | 2.4 | 2.7 | 6.5 |
| C. Ex. 9 | 1.6 | 3.1 | 0.5 | 1.5 | 4.9 | 8.9 | 1.3 | 3.9 | 3.5 | 8.9 |
| C. Ex. 10 | 1.5 | 2.7 | 2.0 | 2.3 | 4.5 | 10.0 | 0.6 | 0.7 | 3.0 | 9.0 |
| C. Ex. 11 | 1.7 | 2.9 | 0.4 | 1.2 | 4.2 | 9.8 | 0.5 | 0.6 | 1.0 | 4.5 |

|  | characteristic properties of film | characteristic properties of tape | | | |
|---|---|---|---|---|---|
|  | friction coefficient | initial output | output after storage | output after running | resonance at the time of recording |
| Ex. 4 | ○ | ○ | ○ | ○ | ○ |
| Ex. 5 | ○ | ○ | △ | ○ | ○ |
| Ex. 6 | ○ | ○ | ○ | ○ | ○ |
| Ex. 7 | ○ | ○ | △ | ○ | ○ |
| C. Ex. 7 | ○ | ○ | ○ | ○ | × |
| C. Ex. 8 | ○ | ○ | △ | × | ○ |
| C. Ex. 9 | ○ | ○ | × | ○ | ○ |
| C. Ex. 10 | ○ | × | × | × | ○ |
| C. Ex. 11 | ○ | × | × | × | ○ |

Ex.: Example
C. Ex.: Comparative Example

As obvious from Table 2, the polyester film of the present invention has excellent handling properties with a small friction coefficient and can provide a magnetic tape which is excellent in output after storage or after repeated running and is rarely damaged at edges and curled.

What is claimed is:

1. A biaxially oriented polyester film for magnetic recording media which has two surfaces, surface (A) and surface (B), and (1) a Young's modulus in a machine direction of 5.0 GPa or less and a Young's modulus in a direction perpendicular to the machine direction of 8.0 GPa or more, (2) a surface roughness on surface A of 0.3 to 1.5 nm when measured for a measurement area of 246.6×187.5 μm and 0.1 to 3.0 nm when measured for a measurement area of 2.5×1.9 mm and a surface roughness on surface B of 0.6 to 2.5 nm when measured for a measurement area of 246.6×187.5 μm and 0.1 to 5.0 nm when measured for a measurement area of 2.5×1.9 mm, and (3) a heat shrinkage factor in a machine direction when heated at 105° C. for 30 minutes of 0 to 1.5% and when heated at 150° C. for 30 minutes of 2.0 to 5.0% and a heat shrinkage factor in a direction perpendicular to the machine direction when heated at 105° C. for 30 minutes of 0.5 to 3.0% and when heated at 150° C. for 30 minutes of 6.0 to 11.0%.

2. The biaxially oriented polyester film of claim 1, wherein the surface roughness of surface A of the polyester film is 0.3 to 1.5 nm when measured for a measurement area of 246.6×187.5 μm and 0.1 to 2.0 nm when measured for a measurement area of 2.5×1.9 mm and the surface roughness of surface B is 0.6 to 2.5 nm when measured for a measurement area of 246.6×187.5 μm and 0.1 to 2.0 nm when measured for a measurement area of 2.5×1.9 mm.

3. The biaxially oriented polyester film of claim 1, wherein the surface roughness of surface A of the polyester film is 0.3 to 1.5 nm when measured for a measurement area of 246.6×187.5 μm and 0.5 to 3.0 nm when measured for a measurement area of 2.5×1.9 mm and the surface roughness of surface B is 0.6 to 2.5 nm when measured for a measurement area of 246.6×187.5 μm and 2.0 to 5.0 nm when measured for a measurement area of 2.5×1.9 mm.

4. The biaxially oriented polyester film of claim 1, wherein the surface of surface A is the surface for forming a magnetic layer thereon and the surface of surface B is the surface of its opposite side.

5. The biaxially oriented polyester film of claim 1 which has a thickness of 2 μm or more and less than 7 μm.

6. The biaxially oriented polyester film of claim 1 which is made from polyethylene terephthalate or polyethylene-2, 6-naphthalene dicarboxylate.

7. A method for using a biaxially oriented polyester film, which comprises using the biaxially oriented polyester film of claim 1 as a base film for a magnetic recording medium.

8. A magnetic recording medium comprising the biaxially oriented polyester film of claim 1 and a magnetic layer formed on the surface of surface A of the polyester film.

9. The magnetic recording medium of claim 8, wherein the magnetic layer is a ferromagnetic metal thin film layer.

10. The magnetic recording medium of claim 8 which is a magnetic tape of digital recording system.

* * * * *